(12) United States Patent
Yamada

(10) Patent No.: US 11,335,046 B2
(45) Date of Patent: May 17, 2022

(54) DISPLAY METHOD AND DISPLAY APPARATUS

(71) Applicant: SEIKO EPSON CORPORATION, Tokyo (JP)

(72) Inventor: Yusuke Yamada, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/851,519

(22) Filed: Apr. 17, 2020

(65) Prior Publication Data

US 2020/0334881 A1 Oct. 22, 2020

(30) Foreign Application Priority Data

Apr. 18, 2019 (JP) .............................. JP2019-079114

(51) Int. Cl.
*G06T 11/60* (2006.01)
*G06T 3/40* (2006.01)
*G06T 3/60* (2006.01)
*G06F 3/0483* (2013.01)

(52) U.S. Cl.
CPC ............ *G06T 11/60* (2013.01); *G06T 3/4053* (2013.01); *G06T 3/60* (2013.01); *G06F 3/0483* (2013.01); *G06T 3/40* (2013.01); *G06T 2210/36* (2013.01)

(58) Field of Classification Search
None
See application file for complete search history.

(56) References Cited

U.S. PATENT DOCUMENTS

| 6,995,745 | B2 * | 2/2006 | Boon ...................... G06F 3/016 345/156 |
| 7,342,569 | B2 * | 3/2008 | Liang .................... G06F 3/0338 345/156 |
| 9,465,994 | B1 * | 10/2016 | Mishra ............... G06K 9/00791 |
| 2012/0204099 | A1 | 8/2012 | Yamada |
| 2012/0221943 | A1 * | 8/2012 | Yamada .................. G06F 9/451 715/243 |
| 2012/0287165 | A1 | 11/2012 | Yamada |

(Continued)

FOREIGN PATENT DOCUMENTS

| JP | 2011-221586 A | 11/2011 |
| JP | 2012-164292 A | 8/2012 |

(Continued)

*Primary Examiner* — YuJang Tswei
(74) *Attorney, Agent, or Firm* — Oliff PLC

(57) ABSTRACT

A display method is so designed that in an image bundle formed of a plurality of images, the area of each of the images disposed in a central section or a spread section of the image bundle and overlapping with each other is greater than the area of each of the images disposed in positions outside the central section or the spread section and overlapping with each other, and the images disposed in the central section or the spread section of the image bundle preferentially hold and regenerate textures having resolutions higher than the resolutions of the textures used to generate the images disposed in the positions outside the central section or the spread section and are generated by using the textures having the resolutions higher than the resolutions of the textures used to generate the images disposed in the positions outside the central section or the spread section.

6 Claims, 13 Drawing Sheets

(56) References Cited

U.S. PATENT DOCUMENTS

2014/0375762 A1* 12/2014 Ohki ................... H04N 1/3876
348/36
2017/0336705 A1* 11/2017 Zhou ....................... G06T 15/10
2019/0268612 A1* 8/2019 Fukuyasu ........... H04N 21/4728

FOREIGN PATENT DOCUMENTS

| JP | 2012-178002 A | 9/2012 |
| JP | 2012-238223 A | 12/2012 |

* cited by examiner

DISPLAY METHOD AND DISPLAY APPARATUS

The present application is based on, and claims priority from JP Application Serial Number 2019-079114, filed Apr. 18, 2019, the disclosure of which is hereby incorporated by reference herein in its entirety.

BACKGROUND

1. Technical Field

The present disclosure relates to a display method and a display apparatus.

2. Related Art

To allow a user to grasp the content of document data formed of a plurality of pages, there is an invented technology for generating a thumbnail image of each of the plurality of pages and displaying the plurality of generated thumbnail images in the form of a list in which the thumbnail images are juxtaposed or overlap with one another, and the technology is disclosed in JP-A-2011-221586.

In the display method described in JP-A-2011-221586, however, the resolution of the thumbnail images does not accord with the size of an image to be displayed, and the displayed image is blurred when the resolution is low or jaggy when the resolution is too high. The displayed image therefore does not have optimum resolution corresponding to the size of the image, resulting in a problem of poor visibility of the displayed image depending on the size thereof.

SUMMARY

A display method according to the present application is a display method including rotating a plurality of images arranged along a first imaginary axis around a second imaginary axis that intersects the first imaginary axis, further rotating the plurality of images around the first imaginary axis, and displaying the plurality of images on a display section. In an image bundle formed of the plurality of images, an area of each of the images disposed in a central section or a spread section of the image bundle and overlapping with each other is greater than an area of each of the images disposed in positions outside the central section or the spread section and overlapping with each other, and the images disposed in the central section or the spread section preferentially hold and regenerate the textures having resolutions higher than resolutions of the textures used to generate the images disposed in the positions outside the central section or the spread section and are generated by using the textures having the resolutions higher than the resolutions of the textures used to generate the images disposed in the positions outside the central section or the spread section.

In the display method described above, in the image bundle, any of the images moved in a direction along the second imaginary axis may be generated by using the texture that is selected from a texture memory that stores a plurality of the textures having the resolutions different from one another and has the resolution higher than the resolutions of the textures used to generate the images disposed in the positions outside the central section or the spread section.

A display method according to the present application is a display method including rotating a plurality of images arranged along a first imaginary axis around a second imaginary axis that intersects the first imaginary axis, further rotating the plurality of images around the first imaginary axis, and displaying the plurality of images on a display section. In an image bundle formed of the plurality of images, when any of the images moved in a direction along the first imaginary axis reaches a predetermined position, the image that reached the predetermined position is generated by using the texture that is selected from a texture memory that stores a plurality of the textures having resolutions different from one another and has the resolution according to a size of the images displayed on the display section.

In the display method described above, any of the images moved in a direction along the first imaginary axis may be generated by using the texture selected from the texture memory and having the resolution lower than the resolution of the texture used to generate the image before being moved.

In the display method described above, the image that moved in the direction along the first imaginary axis and approached the predetermined position may be generated by using the texture selected from the texture memory and having the same resolution as the resolution of the texture used to generate the image that reached the predetermined position.

A display apparatus according to the present application includes a display section that displays an image bundle formed of a plurality of images, an image generator that rotates the plurality of images arranged along a first imaginary axis around a second imaginary axis that intersects the first imaginary axis and further rotates the plurality of images around the first imaginary axis to generate the plurality of rotated images, and a controller that generates the images disposed in a central section or a spread section of the image bundle by using the textures that are selected from a texture memory that stores a plurality of the textures having the resolutions different from one another and have the resolutions higher than the resolutions of the textures used to generate the images disposed in positions outside the central section or the spread section and displays the generated images on the display section.

DESCRIPTION OF EXEMPLARY EMBODIMENTS

Figure 1:
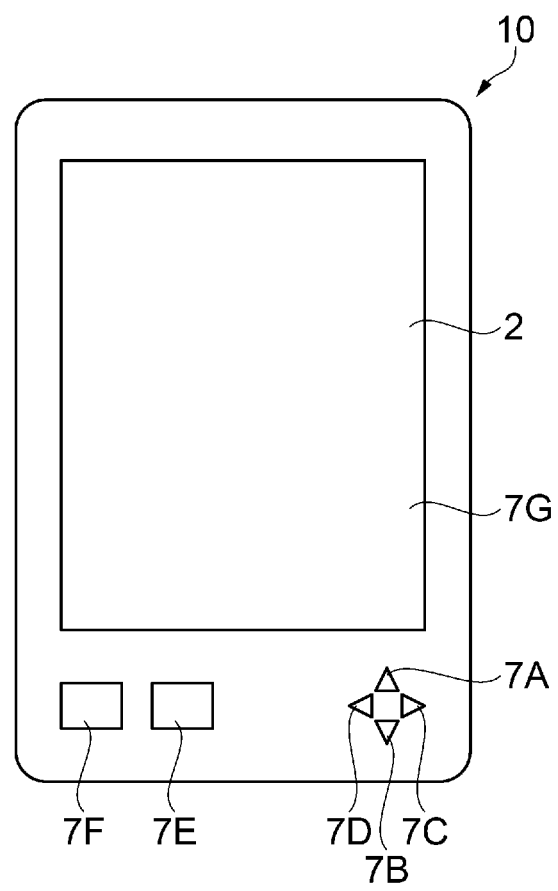
FIG. 1 shows the exterior appearance of a viewer according to a first embodiment.
Figure 1:
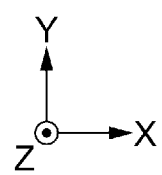

A display method and a display apparatus according to embodiments of the present disclosure will be described below with reference to the drawings. In the embodiments of the present disclosure, the display apparatus will be described with reference to a viewer that allows a user to view and edit an electronic manual and an electronic book, which are each an example of a document containing images, or a document created by the user. In the drawings referred to in the following description, a member or a portion is drawn at longitudinal and lateral scales different from actual scales in some cases for convenience of description and illustration. Further, components other than those necessary for the description are not illustrated in some cases. The following FIGS. 1, 2, 6, 9A, 9B, 10A, 10B, 10C, and 11 show axes X, Y, and Z as three axes perpendicular to one another, and the side facing the front end of the arrow representing any of the axes is a "+" side, and the side facing the base end of the arrow is a "−" side for ease of description. The direction along the axis X is called a "lateral direction," and the direction along the axis Y is called a "longitudinal direction." A side of the lateral direction that is the side corresponding to the direction −X is called left or a left side, and a side of the lateral direction that is the side corresponding to the direction +X is called right or a right side. A side of the longitudinal direction that is the side corresponding to the direction −Y is called below or a lower side, and a side of the longitudinal direction that is the side corresponding to the direction +Y is called above or an upper side. Further, FIGS. 8A to 8E show a first imaginary axis Q and a second imaginary axis M perpendicular to each other, with the first imaginary axis Q corresponding to the axis X described above and the second imaginary axis M corresponding to the axis Y described above.

First Embodiment

Overview of Viewer

An overview of a viewer 10 according to a first embodiment will first be described with reference to FIGS. 1 and 2.

Figure 2:
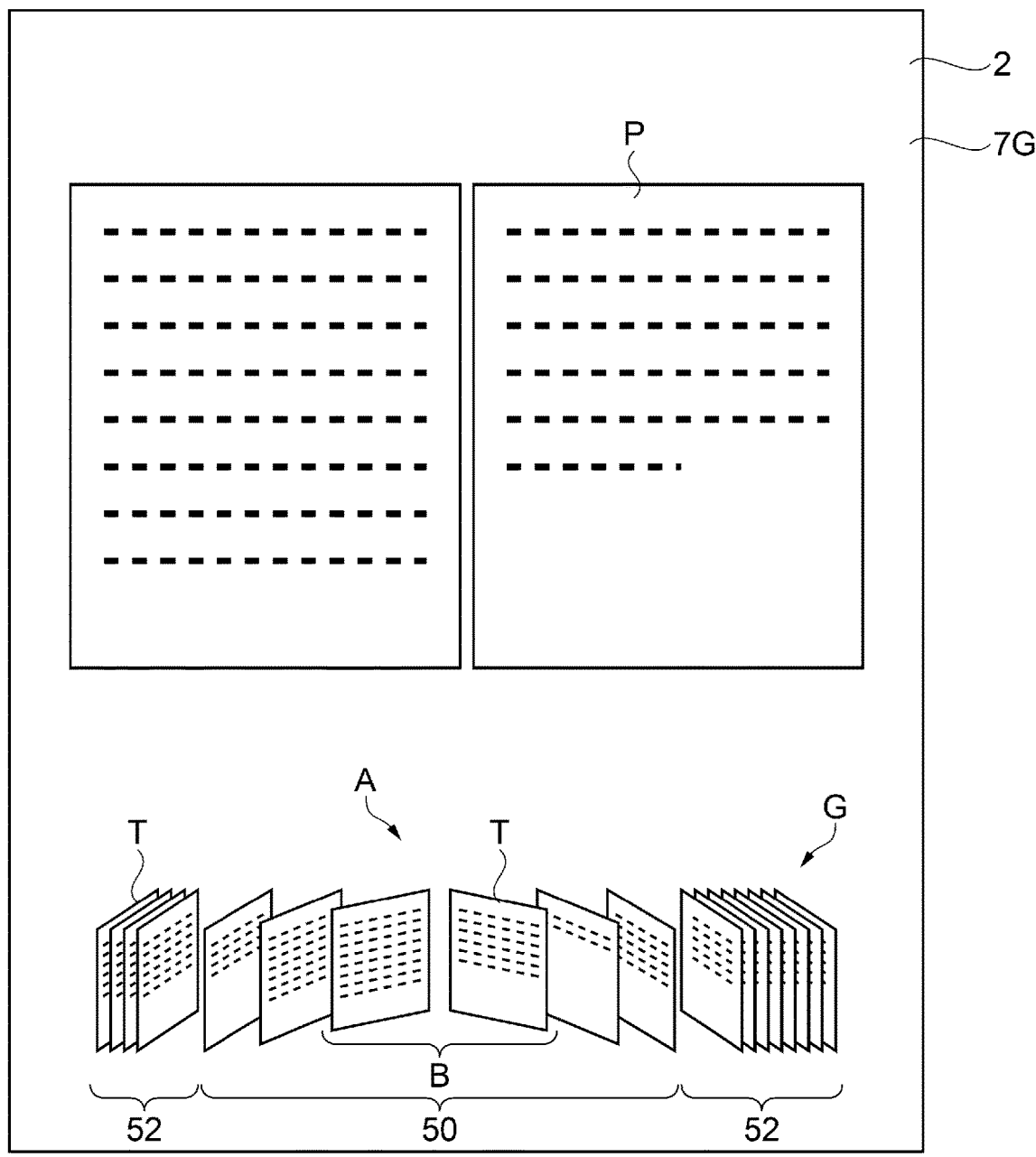
FIG. 2 shows a plurality of images displayed on an image display section.

FIG. 1 shows the exterior appearance of the viewer according to the first embodiment and is a front view of the viewer 10 viewed from the side facing an image display section 2. FIG. 2 shows a plurality of images T displayed on the image display section 2.

The viewer 10 according to the present embodiment is a display apparatus that displays an image. In this example, the viewer 10 is an apparatus for viewing an electronic book as an example of a document or what is called an electronic book reader. The electronic book is document data containing images of a plurality of pages. The viewer 10 displays the electronic book on a certain unit basis on the image display section 2. The certain unit is, for example, a single page. Among a plurality of pages contained in the electronic book, a page to be displayed is called a selected page. The selected page is changed in accordance with the user's operation performed on buttons 7A to 7F or a touch panel 7G shown in FIG. 1. That is, the user can operate the buttons 7A to 7F or the touch panel 7G to turn a page of the electronic book and enlarge and display the selected page. The viewer 10 has the function of executing an application program in addition to the function of viewing an electronic book.

The image display section 2 according to the present embodiment as a display section displays an image bundle G in a lower portion of the image display section 2, and in the image bundle G, images T of the pages of an electronic manual, an electronic book, or a document created by the user are arranged in the lateral direction. Upon an enlargement instruction of enlargement and display of an image T selected from those in the image bundle G, the viewer 10 displays an enlarged image P above the image bundle G, as shown in FIG. 2.

The image bundle G is formed of a static section 52, where images T are arranged at equal intervals, and a central dynamic section 50, where the interval between adjacent images T is greater than the interval between adjacent images T in the static section 52. The image bundle G is disposed in a laterally central portion of the image display section 2 along the lower edge of the image display section 2. The images T disposed in the dynamic section 50 are larger than the images T disposed in the static section 52 in some cases.

The images T are images so sized as to occupy part of the image display section 2. A texture memory stores a plurality of different-resolution textures that form a mipmap. After a mipmap of each of original images is created, the images T are drawn and generated by using textures selected from the texture memory and having resolutions according to the sizes of the images T displayed on the display section 2. The mipmap is a set of textures each having longitudinal and lateral resolutions reduced from those of the original images by a factor of a power of two. When a central section A of the image bundle G, a book, or a magazine is opened, the displayed area of the images T disposed in a spread section B, which is formed of right and left two pages facing each other, and overlapping with each other is greater than the displayed area of the images T disposed in positions outside the central section A or the spread section B of the image bundle G and overlapping with each other. Therefore, to improve the visibility of the images T, the images T disposed in the central section A or the spread section B are so drawn and generated by using textures selected from a texture memory that stores a plurality of the textures having the resolutions different from one another and having resolutions greater than the resolutions of the textures used to generate the images T disposed in positions outside the central section A or the spread section B of the image bundle G.

The original images are images of the pages of an electronic manual, an electronic book, or document data created by the user. The original images may instead be icons of application programs or action screens of application programs. An application program and the action thereof may be allocated to any of the plurality of images T.

The viewer 10 has the buttons 7A to 7F and the touch panel 7G as an input section 7 provided on a surface of the viewer 10 that is the surface where the image display section 2 is disposed. The input section 7 externally takes in an input. The input section 7 accepts the user's operation and processes the accepted operation as an input signal. That is, the user operates the input section 7 to input predetermined operation to the viewer 10.

System Configuration of Viewer

The system configuration of the viewer 10 will next be described with reference to FIGS. 3 and 4.

Figure 3:
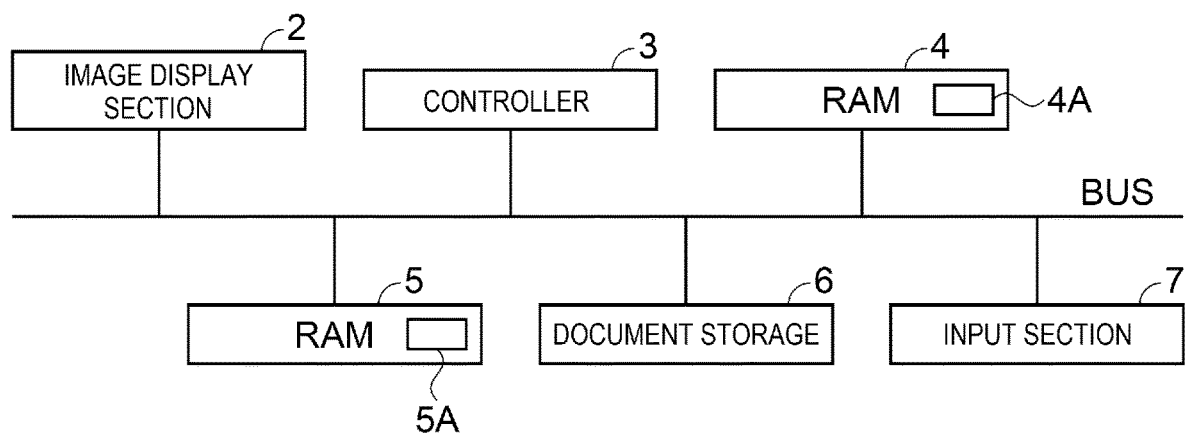
FIG. 3 is a block diagram showing the system configuration of the viewer.
Figure 4:
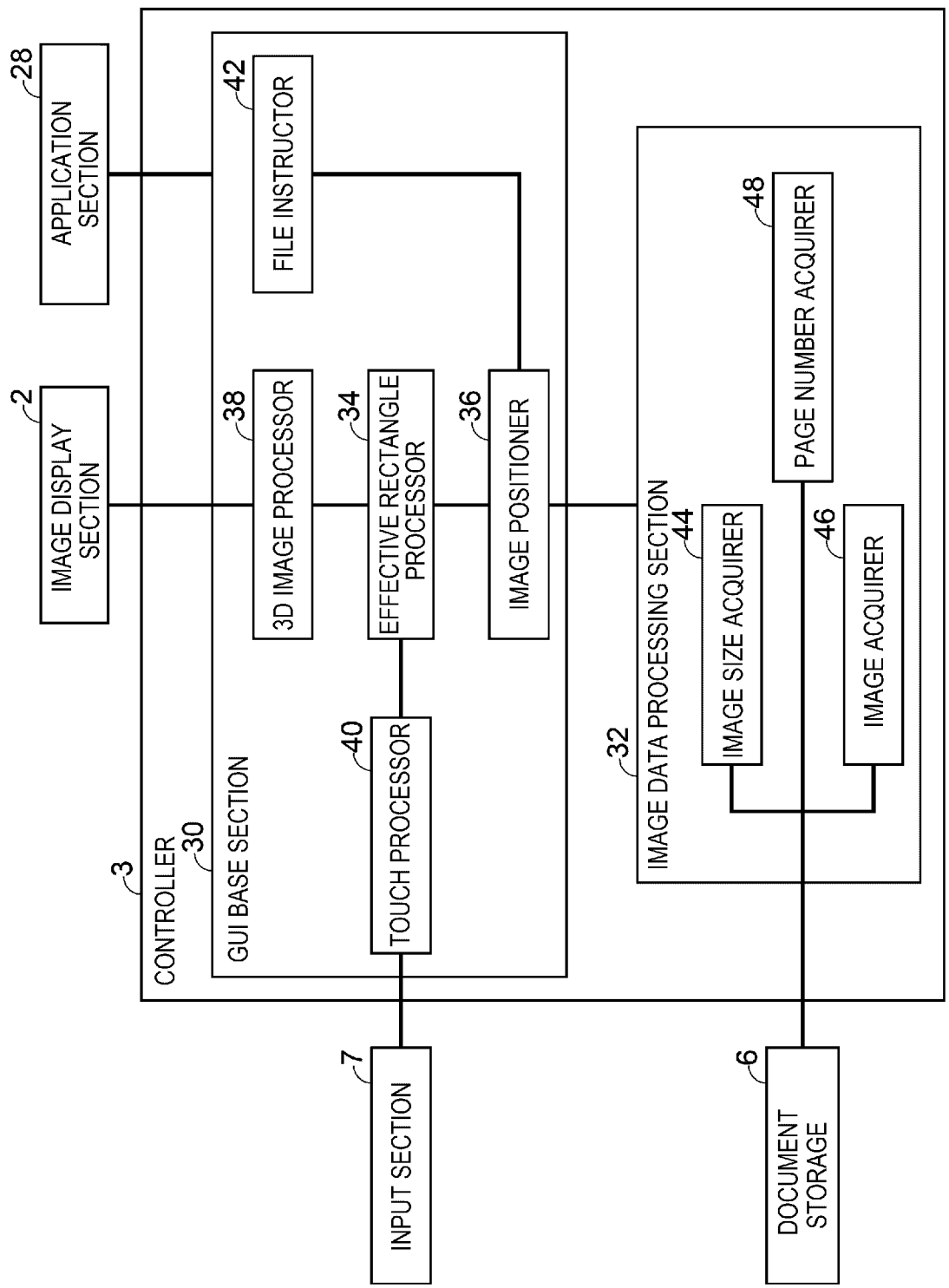
FIG. 4 is another block diagram showing the system configuration of the viewer.

FIGS. 3 and 4 are each a block diagram showing the system configuration of the viewer 10.

The viewer 10 includes the image display section 2, a controller 3, a random access memory (RAM) 4, a RAM 5, a document storage 6, and the input section 7, which are connected to a bus BUS, as shown in FIG. 3. Transmission and reception of a signal or information between the portions connected to the bus BUS are performed via the bus BUS.

The image display section 2 displays the image bundle G, in which the plurality of images T corresponding to the original images are arranged in the lateral direction. Upon the enlargement instruction of enlargement and display of an image T selected from those in the image bundle G, the image display section 2 enlarges the image T indicated by the enlargement instruction and displays the enlarged image T as the enlarged image P above the image bundle G. Upon the instruction of movement of a plurality of images T, the image display section 2 displays motion images showing the plurality of images T in motion. The image display section 2 displays a bird's-eye view that is an image of the image bundle G, in which the images T disposed in an imaginary space having a first imaginary axis Q and a second imaginary axis M, as shown in FIG. 8E, which will be described later, are laterally arranged and which is viewed from an arbitrary viewpoint in the imaginary space.

The image display section 2 includes a display drive circuit that is not shown but outputs a signal that causes a liquid crystal panel or any other component to display an image. The image display section 2 displays image data stored in the RAM 5 as the image. The image data forms an entire image displayed in an image display region of the image display section 2 and containing, for example, the image bundle G formed of a plurality of images T and the enlarged image P, and the image data also forms a display image frame that is one frame in the motion images.

The controller 3 is an apparatus that controls each portion of the viewer 10 and is, for example, a microcomputer including a central processing unit (CPU), a graphics processing unit (GPU), a read only memory (ROM), and other components. The CPU and the GPU execute a program stored in the ROM by using the RAMS 4 and 5 as a work area. The CPU creates a mipmap of each of the images T that are identical to the original images, temporality stores the mipmaps in texture data 4A in the RAM 4, which is a memory dedicated to the CPU, and then transmits the mipmaps to the GPU. The GPU receives a plurality of textures having different resolutions from the texture data 4A and stores the plurality of textures in a texture memory 5A in the RAM 5, which is dedicated to the GPU. The ROM stores, for example, an operating system (OS) program for controlling basic actions of the viewer 10 and a display program that displays the images T on the image display section 2.

The controller 3 controls each portion of the viewer 10 based on the programs stored in the ROM. For example, the controller 3 creates a mipmap from each of the original images and performs the following control: That is, the controller 3 stores the plurality of textures having different resolutions and stored in the texture data 4A in the RAM 4 in the texture memory 5A in the RAM 5; processes the input signal transmitted from the input section 7 to identify the content of operation performed on any of the buttons 7A to 7F and the touch panel 7G operated by the user, and causes the viewer 10 to operate based on the operated one of the buttons 7A to 7F and the touch panel 7G and the identified content. The controller 3 further controls image processing of drawing and generating the images T to be displayed on the image display section 2 by using textures selected from the texture memory 5A, which stores the plurality of textures having different resolutions. Examples of the image processing may include drawing and generating the images T by using selected textures, displaying the generated image T on the image display section 2, and converting the generated images T into a bird's-eye image.

The controller 3 draws and generates the images T disposed in the central section A or the spread section B of the image bundle G by using textures selected from the texture memory 5A, which stores the plurality of textures having different resolutions, and having resolutions higher than the resolutions of the textures used to generate the images T disposed in positions outside the central section A or the spread section B.

To store a new texture having a resolution different from the resolutions of the textures stored in the texture memory 5A in the texture memory 5A and generate and display the images T by using the new texture, when the texture memory 5A does not have free space large enough to store the new texture, the controller 3 deletes a texture stored in the texture memory 5A in a lexicographic order that gives priority to old use history over high resolution, stores the new texture in the provided free space of the texture memory 5A, generates the images T by using the new texture, and displays the generated images T on the image display section 2.

The RAM 4 is a memory that stores the contents of the image processing performed by the controller 3 and is dedicated to the CPU. The texture data 4A in the RAM 4 temporarily stores the mipmap of each of the original images of the pages, which is created by the CPU, and when the mipmaps are transmitted to the GPU, the mipmaps are deleted from the texture data 4A.

The RAM 5 is a memory that stores the relationship between the content of the image drawing performed by the controller 3 and the image data and is a memory dedicated to the GPU. The texture memory 5A in the RAM 5 stores the plurality of different-resolution textures that form the mipmaps transmitted from the texture data 4A. The RAM 5 is also a memory that stores image data containing the images T drawn and generated by using textures selected from the texture memory 5A. The image data stored in the RAM 5 is displayed on the image display section 2.

The RAM 5, which is a memory dedicated to the GPU, and which performs the image drawing, has a high memory access speed in the process of drawing of the images T, whereby the images T can be drawn and the image data can be generated at high speed. Motion images can therefore be handled.

The document storage 6 is a rewritable memory and stores document data, such as an electronic manual, an electronic book, or a document created by the user. The document storage 6 can store a plurality of different sets of document data and rewrite the document data as appropriate. The document storage 6 is a nonvolatile memory that stores a variety of data and application programs in addition to the document data. The document storage 6 may, for example, be a semiconductor memory built in the viewer 10 or a detachable external memory, such as an SD memory card.

The input section 7 includes the buttons 7A to 7F shown in FIG. 1. When any of the buttons 7A to 7F is operated, the input section 7 transmits an input signal corresponding to the operated button to the controller 3. The input section 7 includes the touch panel 7G.

The controller 3 includes a GUI base section 30, which serves as an image generator that produces the images T, and an image data processing section 32, as shown in FIG. 4.

The GUI base section 30 creates a mipmap from each of the original images and stores the mipmaps in the texture data 4A in the RAM 4. The GUI base section 30 then stores the mipmaps, that is, the plurality of textures having different resolutions in the texture memory 5A in the RAM 5. The GUI base section 30 selects textures having the resolutions according to the sizes of the images T to be displayed on the image display section 2 from the texture memory 5A and draws and generates the images T to be displayed on the image display section 2 by using the selected textures. Specifically, the GUI base section 30 selects textures having resolutions higher than the resolutions of the textures used to generate the images T disposed in positions outside the central section A or the spread section B of the image bundle G from the texture memory 5A and draws and generates the images T disposed in the central section A or the spread section B of the image bundle G by using the selected textures.

The GUI base section 30 rotates the plurality of images T arranged along the first imaginary axis Q around the second imaginary axis M, which intersects the first imaginary axis Q, and further rotates the plurality of images T around the first imaginary axis Q to generate images T that form a bird's-eye image. The GUI base section 30 then generates a bird's-eye image that is an image of the image bundle G disposed in the imaginary space and viewed from an arbitrary viewpoint in the imaginary space.

The GUI base section 30 includes an effective rectangle processor 34, an image positioner 36, a 3D image processor 38, a touch processor 40, and a file instructor 42.

The effective rectangle processor 34 sets the dimension of the rectangular shape of the image bundle G in the image display region of the image display section 2.

The image positioner 36 determines an angle of rotation $\theta$ by which the images T are rotated around the second imaginary axis M and an angle of depression $\phi$ by which the images T are rotated around the first imaginary axis Q. The GUI base section 30 generates the images T that form a bird's-eye view based on the determined angle of rotation $\theta$ and angle of depression $\phi$.

The image positioner 36 divides the image bundle G formed of the plurality of images T into the static section 52, where images T are arranged at equal intervals, and the dynamic section 50, where the interval between adjacent images T is greater than the interval between adjacent images T in the static section 52, with adjacent images T overlapping each other and determines the X-coordinate positions where the plurality of images T are arranged in the static section 51 and the dynamic section 50. The image positioner 36 also determines the position where the spread section B is disposed and the position where the enlarged image P is disposed. The image positioner 36 also determines the number of images disposed in each of the dynamic section 50 and the static section 52.

The 3D image processor 38 is, for example, a FrameBuffer, which is a GPU.

The 3D image processor 38 performs calculation necessary for image drawing, such as 3D graphics, selects, for each of the images T corresponding to the pages, a texture having a resolution according to the size of the image T displayed on the image display section 2 from the texture memory 5A, which is the memory dedicated to the GPU, and draws and generates the image T by using the selected texture. More specifically, the images T disposed in the central section A or the spread section B of the image bundle G are drawn and generated by using textures which are selected from the texture memory 5A, which stores the plurality of textures having different resolutions, and which have resolutions larger than the resolutions of the textures used to generate the images T disposed in positions outside the central section A or the spread section B of the image bundle G. The 3D image processor 38 further generates image data as the image bundle G where the images T that form the bird's-eye view are arranged. The generated image data is stored in the RAM 5. In the case of motion images, the 3D image processor 38 generates image data as the display image frame on a displayed frame basis.

The touch processor 40 detects the user's operation of touching the touch panel 7G. The touch processor 40 acquires a touch signal from the touch panel 7G.

The file instructor 42 instructs the image data processing section 32 to read the original images of the pages of the document data based on the data supplied from the touch processor 40. The file instructor 42 is, for example, the function of Android (registered trademark), which is an operation system for mobile instruments.

The image data processing section 32 is, for example, a PDF library.

The image data processing section 32 includes an image size acquirer 44, an image acquirer 46, and a page number acquirer 48.

The image size acquirer 44 acquires the lateral and longitudinal lengths of the original images of the pages of the document data from the document storage 6.

The image acquirer 46 acquires the original images of the pages of the document data from the document storage 6.

The page number acquirer 48 acquires the number of pages of the document data from the document storage 6.

An application section 28 is, for example, application software, such as software for printing a photograph, a document, and other objects, software for printing new-year's cards, and software for projecting a photograph, a document, and other objects via a projector.

Action of Viewer

The action of the viewer 10 will next be described with reference to FIGS. 5 to 8E.

Figure 5:
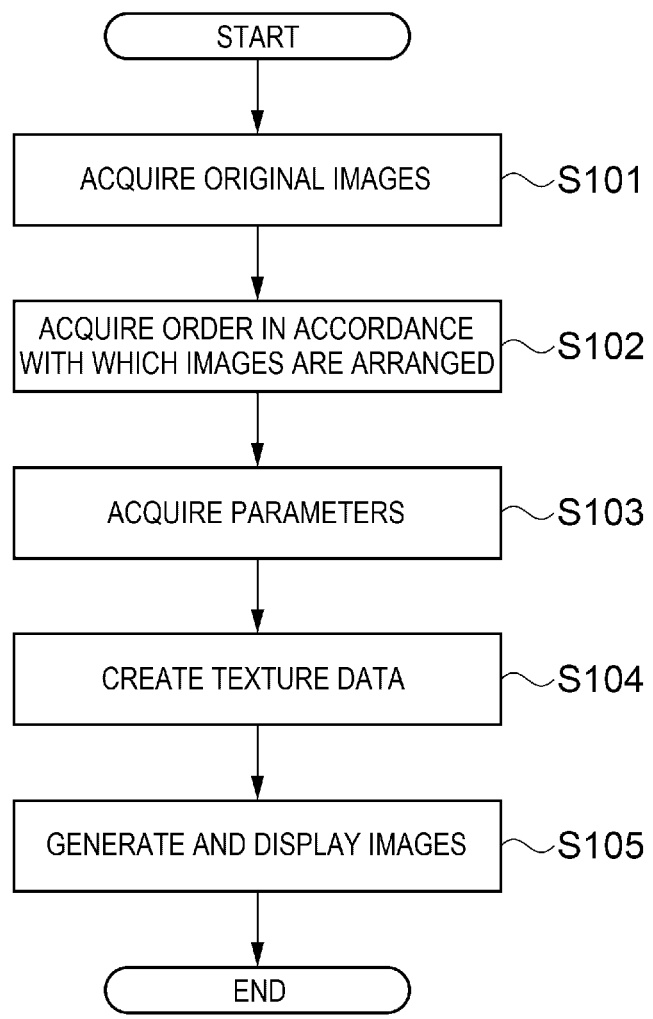
FIG. 5 is a flowchart showing an example of processes carried out by the viewer.
Figure 6:
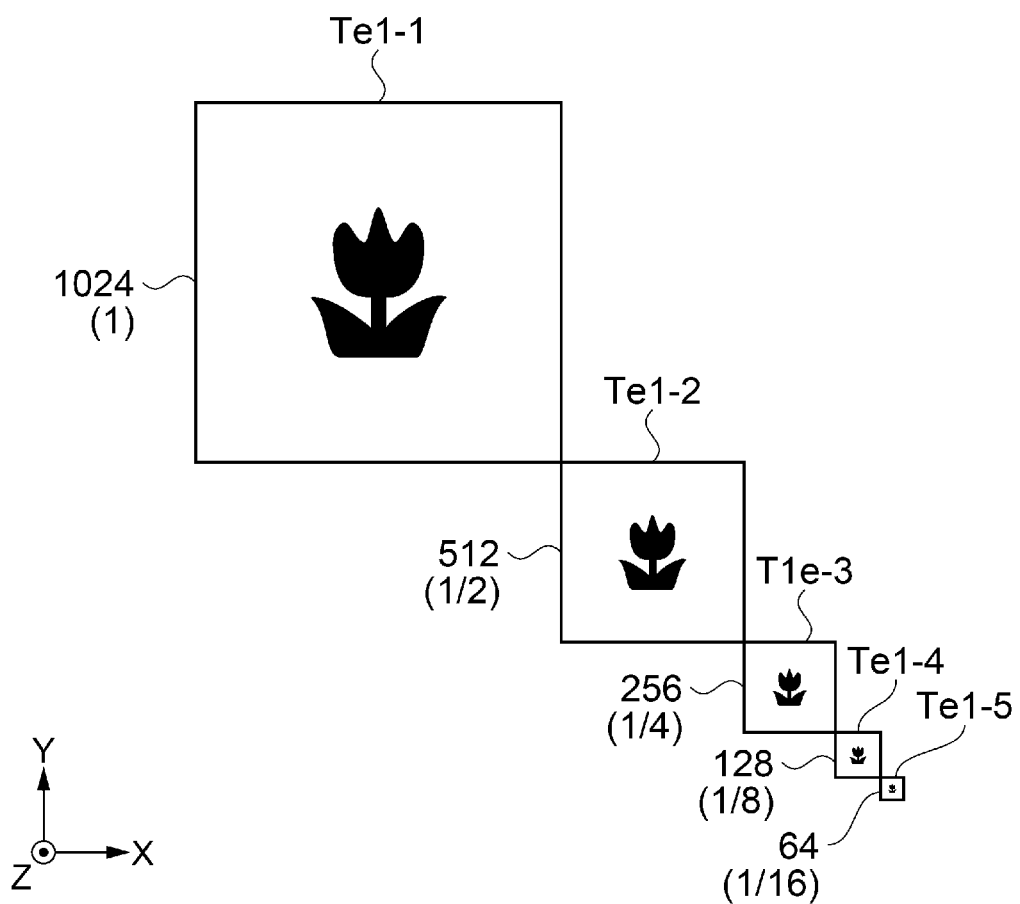
FIG. 6 describes a mipmap.
Figure 7:
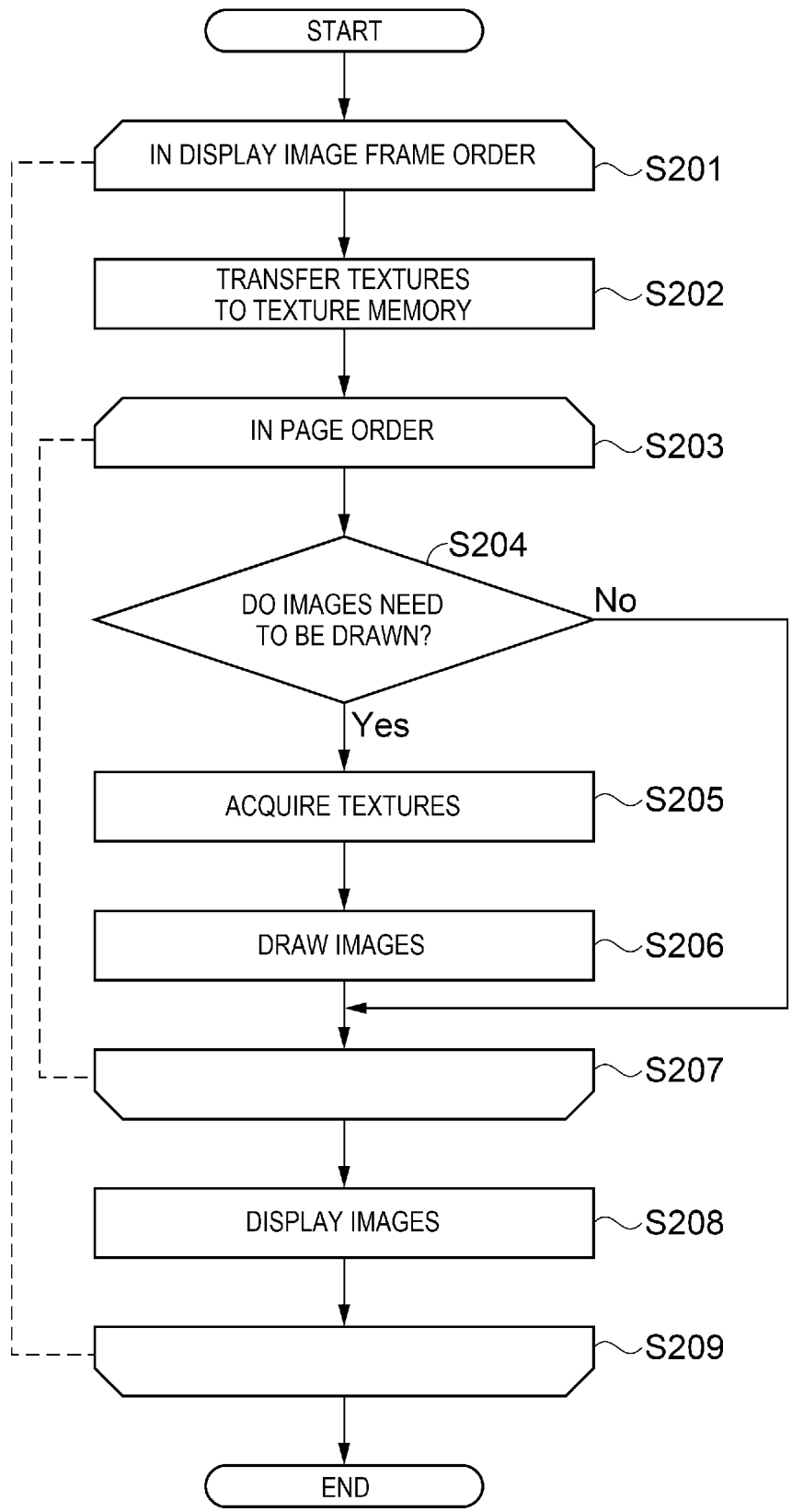
FIG. 7 is a flowchart showing an example of processes carried out by the viewer.

FIGS. 5 and 7 are flowcharts showing an example of processes carried out by the viewer 10. FIG. 6 describes a mipmap. FIGS. 8A to 8E describe the process of generating a bird's-eye view. The action of the controller 3 will be described below along the flowcharts shown in FIGS. 5 and 7 with reference to FIG. 3.

The procedure shown in FIG. 5 starts in response to a trigger, for example, when a predetermined event occurs, for example, when the viewer 10 is powered on, or when the viewer 10 is instructed, for example, to display a menu screen.

In step S101, the controller 3 first acquires images T to be processed, in this example, the original images that are the source of the plurality of images T that form the image bundle G from the document storage 6.

In step S102, the controller 3 then acquires data representing the order in accordance with which the plurality of images T are arranged from the document storage 6. The data contains identifiers of the images T and numbers representing the arrangement order.

In step S103, the controller 3 then acquires parameters used to display the image bundle G. The parameters are stored in the document storage 6 along with the identifiers of the image T. The acquired parameters include the number of images and the width of the images. The number of images is a parameter representing the number of images T contained in the image bundle G. The width of the images is a parameter representing the lateral length of the image bundle G.

In step S104, the controller 3 then causes the GUI base section 30 to create a mipmap of each of the images T that correspond to the pages and are identical to the original images of the pages to create the texture data 4A. In detail, the controller 3 causes the GUI base section 30 to create textures having longitudinal and lateral resolutions both reduced from those of the original images of the pages acquired in step S101 by a factor of a power of two and stores all mipmaps corresponding to the pages in the texture data 4A in the RAM 4.

The mipmaps created by the GUI base section 30 will now be described.

The controller 3 causes the GUI base section 30 to create, based on the original images of the pages, a mipmap formed of a texture Tel-1 having longitudinal and lateral resolutions of 1024 pixels, a texture Tel-2 having longitudinal and lateral resolutions of 512 pixels, a texture Tel-3 having longitudinal and lateral resolutions of 256 pixels, a texture Tel-4 having longitudinal and lateral resolutions of 128 pixels, and a texture Tel-5 having longitudinal and lateral resolutions of 64 pixels, as shown, for example, in FIG. 6, and stores the mipmap in the texture data 4A in the RAM 4. The mipmaps can be created by causing the CPU to execute a mipmap creation program stored in the ROM. The present embodiment is described with reference to the mipmap having the textures Tel-1 to Tel-5 having the resolutions of 1024 to 64 pixels, that is, a mipmap having textures having 1024 pixels multiplied by 1, ½, ¼, ⅛, and 1/16, but not necessarily. Textures having resolutions of 32 pixels, 16 pixels, 8 pixels, or any other number of pixels or textures having resolutions greater than 1024 pixels may be used. The resolution of a texture only needs to be set in accordance with the size of the image display section 2 and the sizes of images T to be displayed on the image display section 2.

In step S105, the controller 3 then transmits a plurality of different-resolution textures that form mipmaps of the original images from the texture data 4A to the texture memory 5A in the RAM 5 and registers and stores the textures therein. The controller 3 then selects one texture having the resolution according to the size of an image T to be displayed on the image display section 2 from the texture memory 5A and draws and generate the image T by using the selected texture. Since the area of each of the images T disposed in the central section A or the spread section B of the image bundle G and overlapping with each other is greater than the area of each of the images T disposed in positions outside the central section A or the spread section B of the image bundle G and overlapping with each other, textures having resolutions higher than the resolutions of the textures used to generate the images T disposed in positions outside the central section A or the spread section B of the image bundle G are selected from the texture memory 5A, and the images T disposed in the central section A or the spread section B of the image bundle G are generated by using the selected textures. The action described above is repeated for all the pages to generate the image bundle G formed of the plurality of images T, and the image bundle G is stored as the image data in the RAM 5. The controller 3 then reads the image data containing the generated images T from the RAM 5 and displays the image data as the display image frame on the image display section 2.

The action of generating the images T and displaying the images T on the image display section 2 in step S105 will be described below with reference to the flowchart shown in FIG. 7.

In step S201, the controller 3 then repeatedly generates the display image frame in accordance with the frame order. The display image frame corresponds to one of a plurality of still images that form motion images. In the present embodiment, the display image frame is generated 60 times per second and displayed on the image display section 2.

In step S202, when a plurality of textures having resolutions necessary to draw the images T to be displayed on the image display section 2 are usable in the texture data 4A, the controller 3 then transfers data on the plurality of textures from the texture data 4A, registers and stores the data in the texture memory 5A, and deletes the data from the texture data 4A.

In step S203, the controller 3 then repeatedly performs the actions in steps S204 to S206 in accordance with the page order to draw and generate the images T of all the pages.

In step S204, the controller 3 then evaluates whether the images T need to be drawn, and when the result of the evaluation is "Yes" or when the images T need to be drawn, the controller 3 proceeds to step S205. When the result of the evaluation is "No" or when the images T do not need to be drawn, the controller 3 proceeds to step S207 and repeatedly performs the actions in steps S204 to S206. The case where the images T do not need to be drawn is a case where the images T disposed in the central section A or the spread section B of the image bundle G or the images T disposed in positions outside the central section A or the spread section B of the image bundle G are static images so that the images T generated in the preceding frame can be used with no change. It is therefore unnecessary to draw and generate the images T again.

In step S205, the controller 3 then selects and acquires textures having the resolutions corresponding to the sizes of the images T to be displayed on the image display section 2 from the texture memory 5A. When the images T are disposed in the central section A or the spread section B of the image bundle G, textures having resolutions higher than the resolutions of the textures used to generate the images T disposed in position outside the central section A or the spread section B of the image bundle G are selected and acquired from the texture memory 5A.

In step S206, the controller 3 then uses the textures selected from the texture memory 5A to draw and generate the images T. The controller 3 then deforms the generated images T to generate images T that form a bird's-eye view. Specifically, the GUI base section 30 rotates the plurality of images T arranged on the first imaginary axis Q around the second imaginary axis M, which intersects the first imaginary axis Q, and further rotates the plurality of images T around the first imaginary axis Q to generate the images T. The angle of rotation θ by which the plurality of images T are rotated around the second imaginary axis M shown in FIG. 8A is determined by the image positioner 36.

Figure 8A:
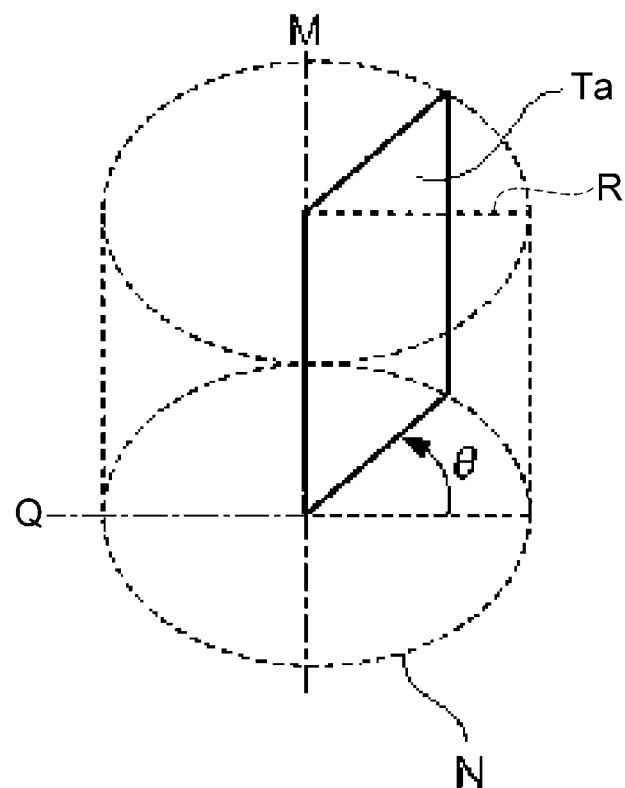
FIG. 8A describes the process of generating a bird's-eye view.

The GUI base section 30 disposes an image Ta in such a way that the image Ta stands on the first imaginary axis Q set in an imaginary horizontal plane N in the imaginary space and rotates the image Ta by the angle of rotation θ from a reference position R, where the lateral direction of the image Ta is parallel to the lateral direction of the display region, around the second imaginary axis M, which intersects the first imaginary axis Q, as shown in FIG. 8A. Further, the GUI base section 30 generates an image by rotating the image Ta rotated around the second imaginary axis M in the imaginary space by the angle of depression φ, which is not shown, around the first imaginary axis Q. That is, the GUI base section 30 generates an image that is the image Ta rotated around the second imaginary axis M and obliquely viewed down at the angle of depression φ, which is not shown, from a viewpoint above the upper edge of the image Ta in the imaginary space. In other words, the image is generated in the form of a bird's-eye image that is the image Ta obliquely viewed at the angle of depression φ, which is not shown, from a viewpoint above the upper edge of the image Ta in the imaginary space. Before the image T is rotated, the lateral direction of the image T is parallel to the lateral direction of the display region, and the angle of rotation θ is 0°. The angle of depression φ is an angle specified in advance. The second imaginary axis M is not necessarily parallel to the longitudinal edges of the image T and may intersect the lateral edges of the image T.

Figure 8B:
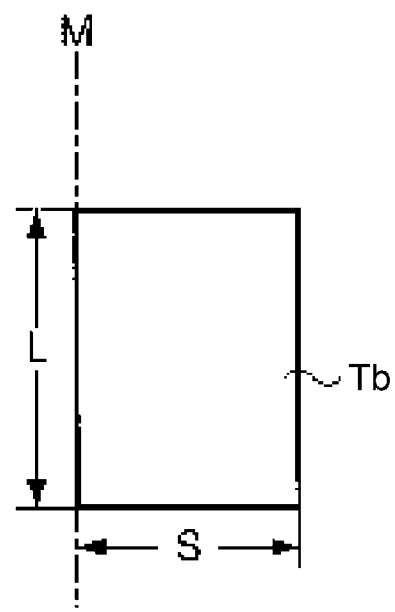
FIG. 8B describes the process of generating the bird's-eye view.
Figure 8C:
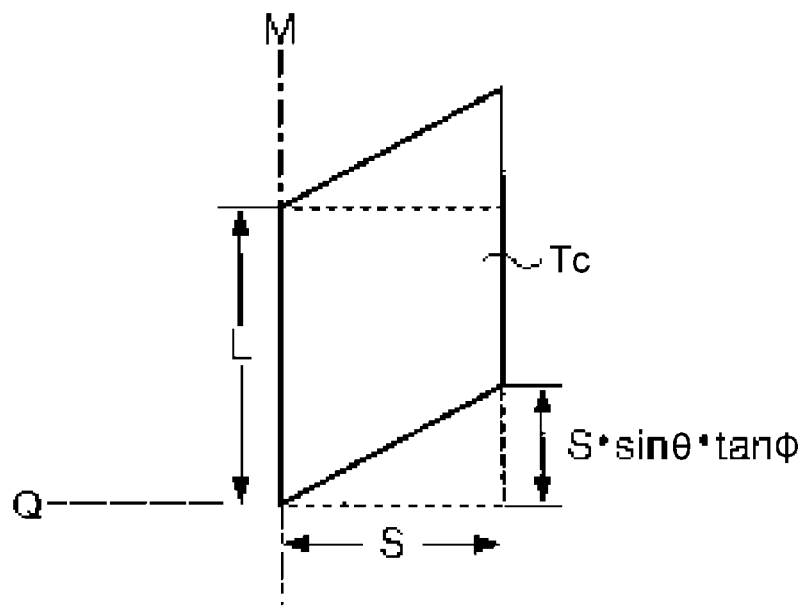
FIG. 8C describes the process of generating the bird's-eye view.
Figure 8D:
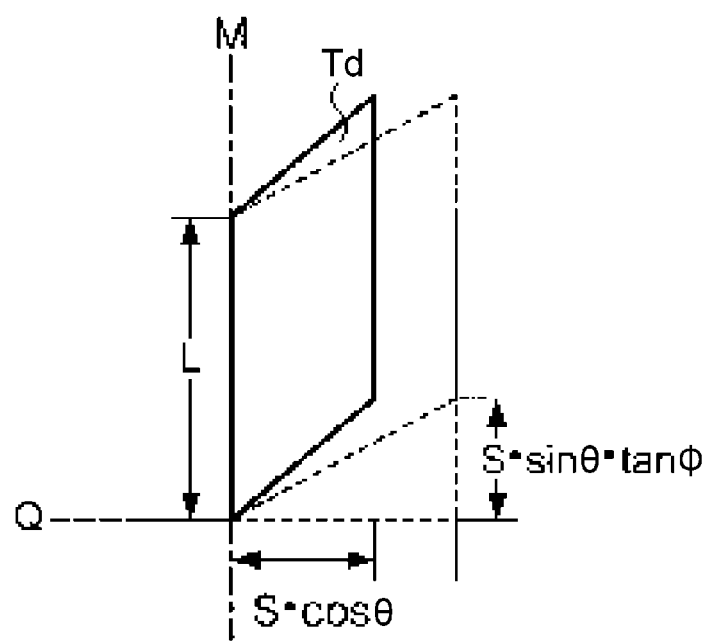
FIG. 8D describes the process of generating the bird's-eye view.
Figure 8E:
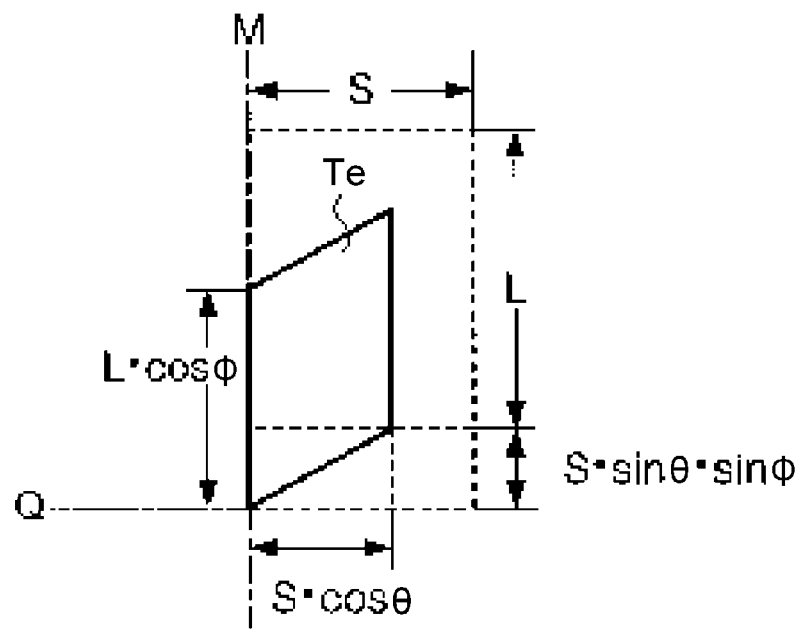
FIG. 8E describes the process of generating the bird's-eye view.

Specifically, the GUI base section 30 first deforms an image Tb shown in FIG. 8B, which is an image of each page viewed from the front, in the longitudinal direction with the lateral width of the image Tb unchanged and shifts the right edge of the image Tb in FIG. 8B relative to the left edge thereof by S·sin θ·tan φ to generate an image Tc, as shown in FIG. 8C. The GUI base section 30 then generates an image Td, which is the image Tc in FIG. 8C reduced in size in the lateral direction by a factor of cos θ, as shown in FIG. 8D. As a result, the lateral width of the image Td is S·cos θ. Thereafter, the GUI base section 30 finally generates an image Te, which is the image Td in FIG. 8D reduced in size in the longitudinal direction by a factor of cost, as shown in FIG. 8E. As a result, the longitudinal dimension of the image Te is L·cos φ. The thus generated image T is an image of the page rotated by the angle of rotation θ around the second imaginary axis M and further rotated around the first imaginary axis Q. In other words, the generated image T is an image of the page rotated around the second imaginary axis M by the angle of rotation θ and obliquely viewed down at the angle of depression φ from a viewpoint above the upper edge of the page. The controller 3 stores the generated image T in the RAM 5.

The controller 3 then proceeds to step S207, then returns to step S203, repeats the actions in steps S204 to S206 in accordance with the page order. After all the pages are processed, the controller 3 proceeds to step S208.

In step S208, the controller 3 then reads the images T stored in the RAM 5, which correspond to the pages and form a bird's-eye view, disposes the images T in X-coordinate positions calculated by the image positioner 36 to generate the image bundle G, and stores the image bundle G as the image data in the RAM 5. A display image frame is thus generated as one frame of motion images. The controller 3 then reads the image data from the RAM 5 and displays the image bundle G as the display image frame on the image display section 2 in such a way that the images T are arranged in ascending order of page number from right to left or left to right along the lateral direction of the image display section 2.

The controller 3 then proceeds to step S209, then returns to step S201, repeats the actions in steps S202 to S208 in accordance with the display image frame order.

As described above, repeating the procedure from steps S202 to S208 shown in FIG. 7 allows the image bundle G containing a plurality of images T to be displayed as motion images on the image display section 2. The procedure shown in FIG. 7 ends in response to a trigger, for example, when a predetermined event occurs, for example, when the viewer 10 is powered off, or when the viewer 10 is instructed, for example, to stop displaying a menu screen.

The present embodiment has been described with reference to a mipmap having textures having longitudinal and lateral resolutions both reduced from those of the original images by a factor of a power of two to generate the images T, but not necessarily. The mipmap may be replaced with a ripmap having textures having longitudinal and lateral resolutions separately reduced from those of the original images by different factors of a power of two or a ripmap having textures having a longitudinal resolution equal to that of the original images and a lateral resolutions reduced from that of the original images by a factor of a power of two, what is called a texture band. In particular, in the case of an image bundle G having a plurality of images T arranged in the lateral direction, as in the present embodiment, the images T each have a substantially fixed longitudinal length but have a lateral length that varies in the dynamic section 50 and the static section 52. It is therefore advantageous in terms of reduction in the capacity of the texture memory 5A to employ a configuration in which the texture memory 5A stores a large number of textures having a fixed resolution in the longitudinal direction and different lateral resolutions.

According to the display method and the viewer 10 as the display apparatus described above, the images T disposed in the central section A or the spread section B of the image bundle G are generated by using textures having resolutions higher than the resolutions of the textures used to generate the images T disposed in positions outside the central section A or the spread section B of the image bundle G, whereby the images T disposed in the central section A or the spread section B of the image bundle G can be more visible than the images T disposed in positions outside the central section A or the spread section B of the image bundle G and generated by using textures having low resolutions. Further the capacity of the texture memory 5A can be reduced.

Second Embodiment

A display method according to a second embodiment will next be described with reference to FIGS. 9A and 9B.

Figure 9A:
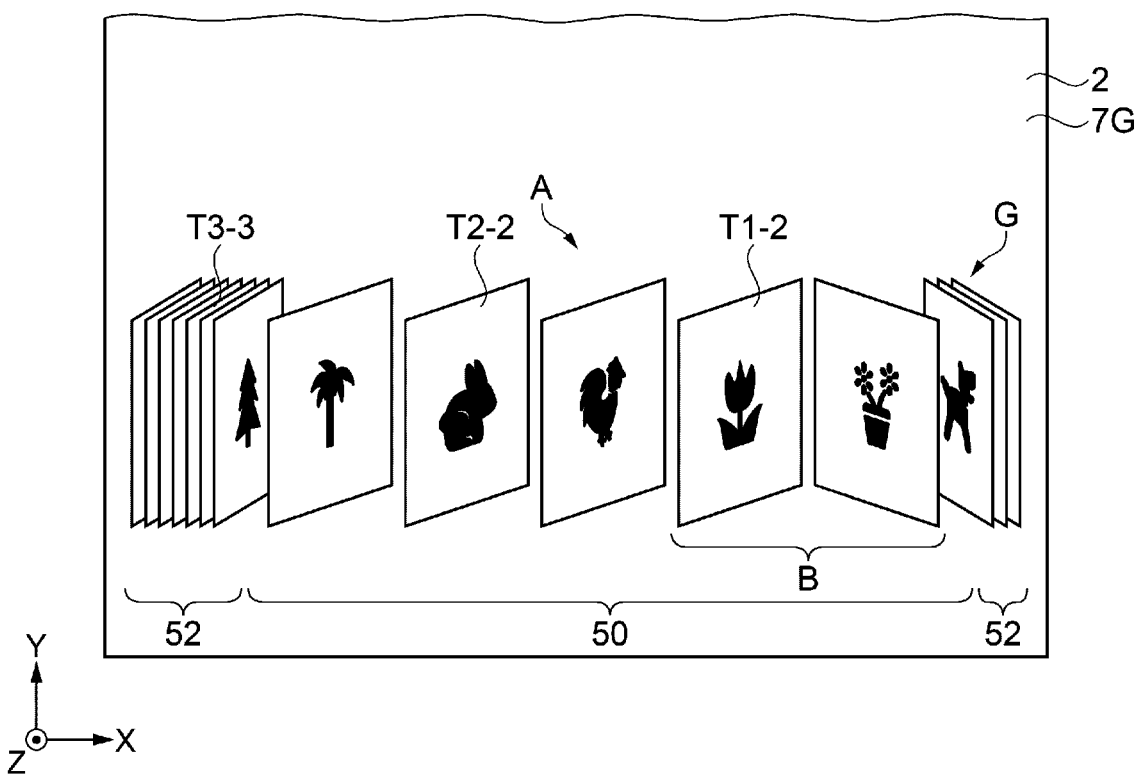
FIG. 9A describes a display method according to a second embodiment.
Figure 9B:
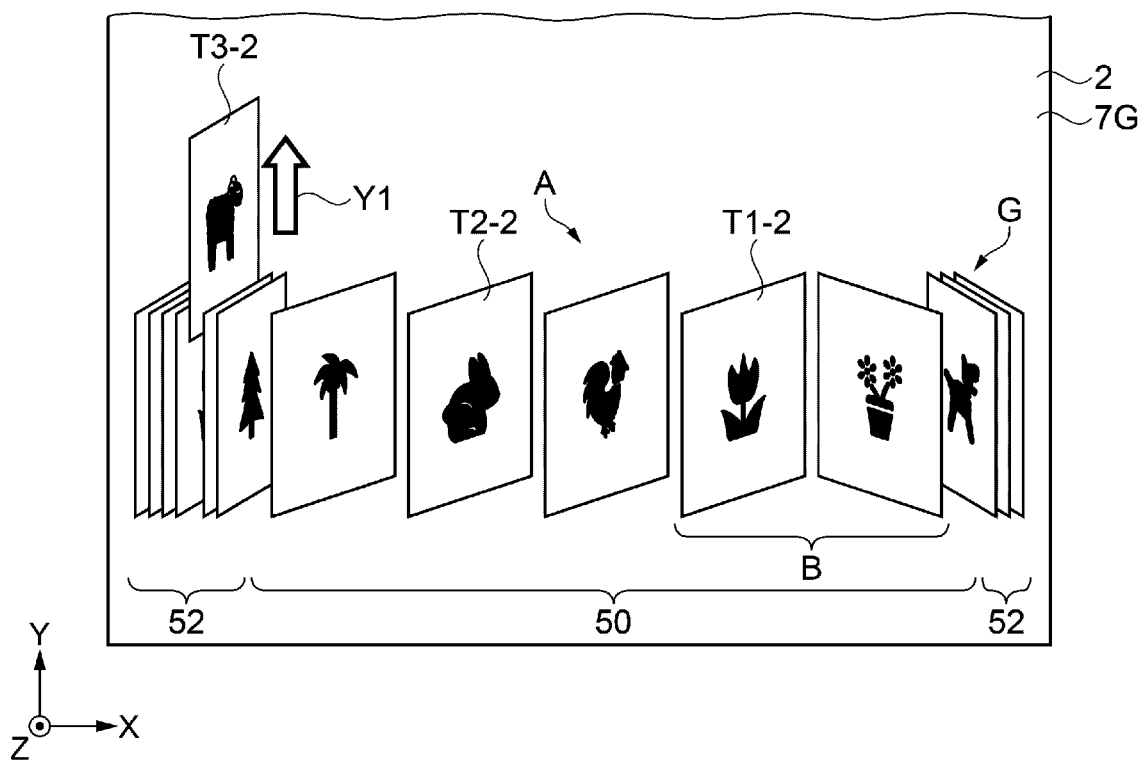
FIG. 9B describes the display method according to the second embodiment.

FIGS. 9A and 9B describe the display method according to the second embodiment.

Differences from the first embodiment described above will be primarily described, and the same items as those in the first embodiment will not be described. The present embodiment is the same as the first embodiment except that the present embodiment relates to a display method in a case where the images T disposed in the image bundle G are moved in the upward direction, which is the direction along the second imaginary axis M. Further, the present embodiment will be described under the assumption that the central section A is the dynamic section 50.

In the display method according to the present embodiment, the user touches the touch panel 7G with a finger to drag and move an image T3-3 disposed in the image bundle G in the direction indicated by the arrow Y1, what is called the upward direction, which is the direction along the second imaginary axis M, as shown in FIG. 9A. When the image T3-3 is extracted upward from the image bundle G, the CPU newly regenerates a texture having a resolution higher than the resolutions of the textures used to generate the images T disposed in positions outside the central section A or the spread section B and transfers the created texture to the texture memory 5A, and an image T3-2 drawn and generated by using the texture is displayed. Specifically, having moved upward, the image T3-3 generated by using the texture having the resolution of 256 pixels is replaced with the image T3-2 generated by using the texture having the resolution of 512 pixels.

The numeral next to the hyphen that forms the reference character representing an image T is defined as follows: A numeral "2" means that the image T is generated by using a texture having the resolution of 512 pixels; a numeral "3" means that the image T is generated by using a texture having the resolution of 256 pixels; and a numeral "4" means that the image T is generated by using a texture having the resolution of 128 pixels, as shown in FIG. 6. The same holds true for the following FIGS. 10A to 11.

As described above, since the image T3-2 moved in the upward direction, which is the direction along the second imaginary axis M, is generated by using a texture having a resolution higher than the resolutions of the textures used to generate the images T disposed in positions outside the central section A or the spread section B, the image T3-2 moved upward can be more visible than the images T disposed in positions outside the central section A or the spread section B.

Third Embodiment

A display method according to a third embodiment will next be described referring to FIGS. 10A, 10B, and 10C.

Figure 10A:
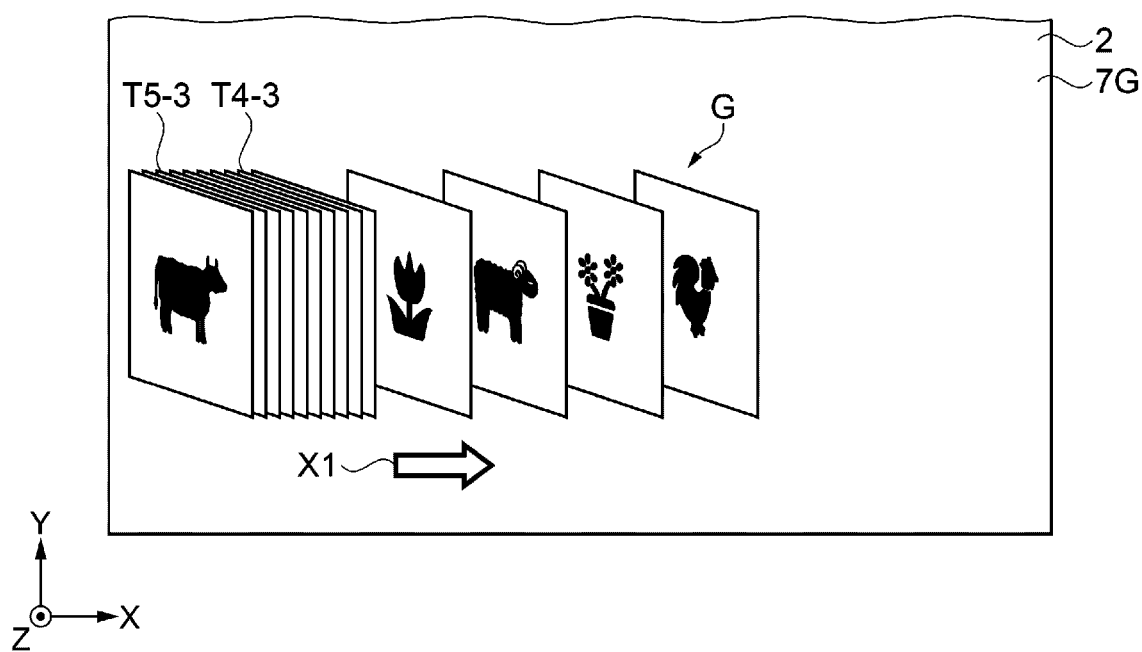
FIG. 10A describes a display method according to a third embodiment.
Figure 10B:
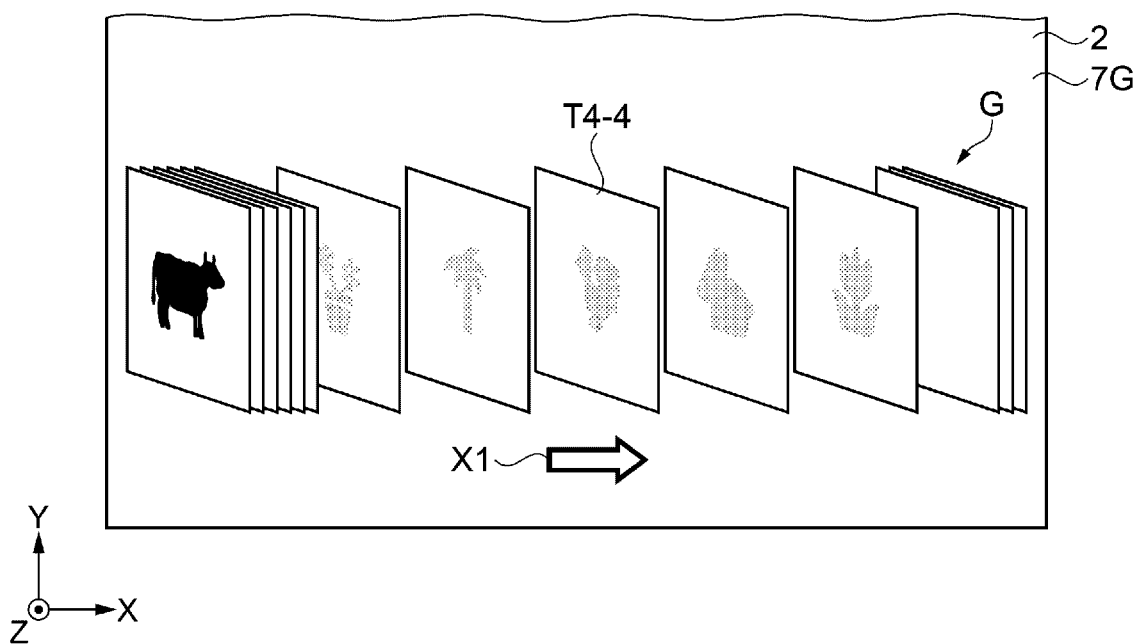
FIG. 10B describes the display method according to the third embodiment.
Figure 10C:
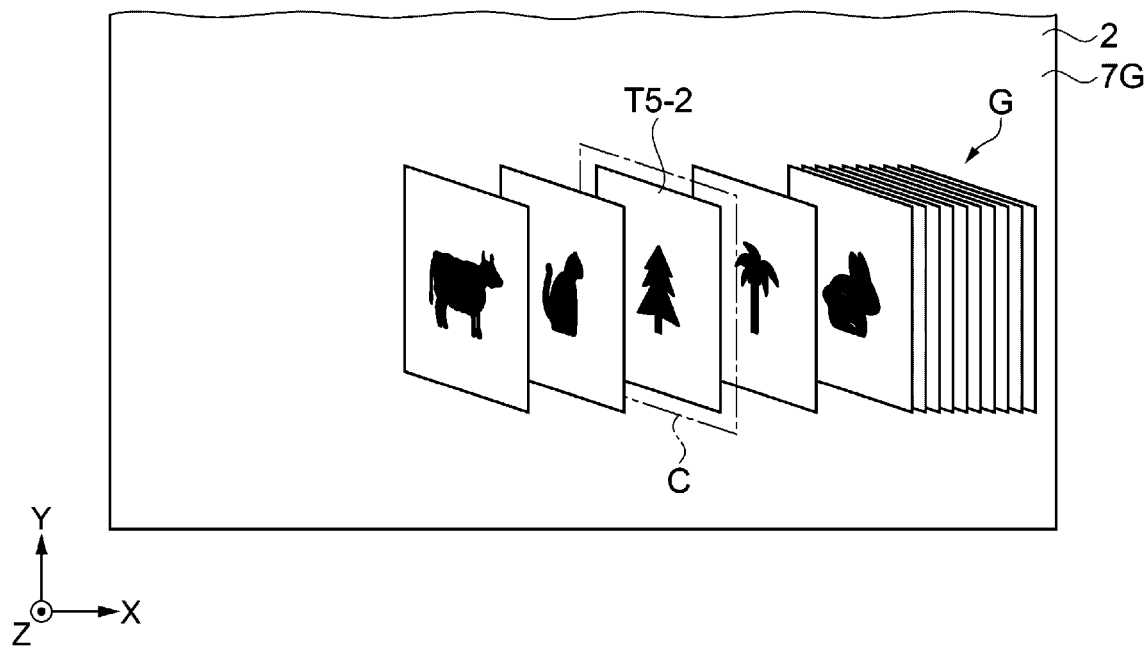
FIG. 10C describes the display method according to the third embodiment.

FIGS. 10A, 10B, and 10C describe the display method according to the third embodiment.

Differences from the first embodiment described above will be primarily described, and the same items as those in the first embodiment will not be described. The present embodiment is the same as the first embodiment except that the present embodiment relates to a display method in a case where an image T5-3 disposed in the image bundle G is so scrolled or caused to jump by a large amount as to reach a predetermined position C.

In the display method according to the present embodiment, the user touches the touch panel 7G with a finger to scroll the image T5-3 disposed in a left portion of the image bundle G or cause the image T5-3 to jump by a large amount in the direction indicated by the arrow X1, what is called the rightward direction, which is the direction along the first imaginary axis Q, as shown in FIG. 10A, so that all the images including the image T5-3 and an image T4-3 are successively moved to a right portion of the image display section 2, as shown in FIG. 10B. Thereafter, a right-end portion of the image bundle G is so displayed that adjacent images overlap with each other with a narrow interval therebetween, and an image T5-2 having reached the predetermined position C is generated by using a texture newly regenerated by the CPU and having the resolution according to the size of the image T to be displayed on the image display section 2 and displayed on the image display section 2, as shown in FIG. 10C. As a specific example, the image T5-3 generated by using a texture having the resolution of 256 pixels before being moved is replaced with the image T5-2 generated by using a texture having the resolution of 512 pixels after reaching the predetermined position C.

An image in motion needs no visibility and may therefore be generated by using a texture selected from the texture memory 5A and having a resolution lower than the resolution of the texture used to generate the image before being moved. As a specific example, the image T4-3 generated by using a texture having the resolution of 256 pixels before being moved is replaced with an image T4-4 generated by using a texture having the resolution of 128 pixels during the movement. When an image moves at high speed, the image may be generated by using a texture having the further lower resolution of 64 pixels and displayed. The CPU's process of creating a mipmap of each of the images T can therefore be omitted with no preparation of a texture having a high resolution for an image that is in short-period motion and approaches the central section A.

As described above, when the image T5-2 moved in the direction along the first imaginary axis Q reaches the predetermined position C, the image T5-2 having reached the predetermined position C is generated by using a texture having the resolution according to the size of the image T displayed on the image display section 2, whereby the image T5-2 can be more visible than the other images T.

Since an image in motion in the direction along the first imaginary axis Q needs no visibility during the movement, a high-resolution texture used to generate the image before being moved is deleted, and the image is generated by using a texture having a lower resolution. The free capacity newly provided in the texture memory 5A can therefore be allocated to a higher-resolution texture used to generate the image T5-2 having reached the predetermined position C.

Fourth Embodiment

A display method according to a fourth embodiment will next be described referring to FIG. 11.

Figure 11:
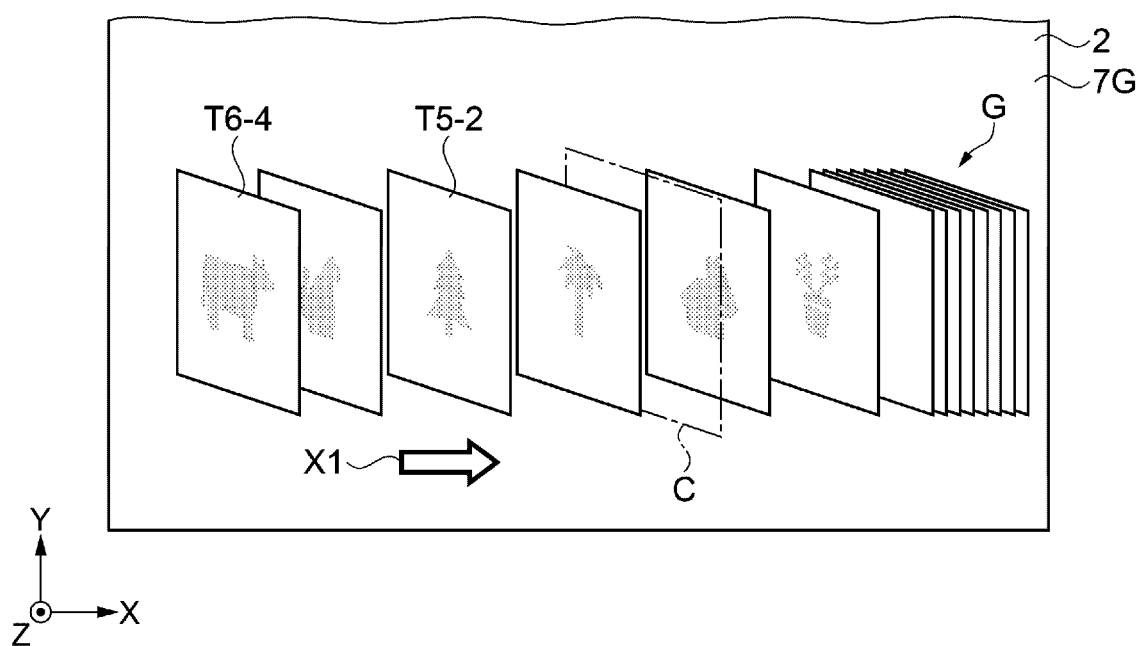
FIG. 11 describes a display method according to a fourth embodiment.

FIG. 11 describes the display method according to the fourth embodiment.

Differences from the first embodiment described above will be primarily described, and the same items as those in the first embodiment will not be described. The present embodiment is the same as the first embodiment except that the present embodiment relates to a display method in a case where the image T5-3 disposed in the image bundle G is so scrolled or caused to jump by a large amount as to approach the predetermined position C.

In the display method according to the present embodiment, when back counting shows that the image T5-3 is scrolled or caused to jump by a large amount in the rightward direction, which is the direction along the first imaginary axis Q, and approaches the predetermined position C, as shown in FIG. 11, the CPU newly regenerates a texture having the resolution according to the size of the image T in the predetermined position C. When the high-resolution texture is transferred to the texture memory 5A and is ready to be used, the image T5-2 is generated by using the texture and displayed. As a specific example, when the image T5-3 generated by using a texture having the resolution of 256 pixels approaches the predetermined position C, the image T5-3 is replaced with the image T5-2 generated by using a texture having the resolution of 512 pixels.

As described above, the image T5-2 having moved in the direction along the first imaginary axis Q and approached the predetermined position C is generated by using a texture having the same resolution as the resolution of the texture used to generate the image T5-2 having reached the predetermined position, whereby the visibility of the image T5-2 that approaches the predetermined position C can be improved.

The contents derived from the embodiments described above will be described below.

The display method is a display method including rotating a plurality of images arranged along a first imaginary axis around a second imaginary axis that intersects the first imaginary axis, further rotating the plurality of images around the first imaginary axis, and displaying the plurality of images on a display section. In an image bundle formed of the plurality of images, the area of each of the images disposed in the central section or the spread section of the image bundle and overlapping with each other is greater than the area of each of the images disposed in positions outside the central section or the spread section and overlapping with each other, and the images disposed in the central section or the spread section preferentially hold and regenerate the textures having resolutions higher than the resolutions of the textures used to generate the images disposed in the positions outside the central section or the spread section and are generated by using the textures having the resolutions higher than the resolutions of the textures used to generate the images disposed in the positions outside the central section or the spread section.

According to the display method, the images disposed in the central section or the spread section of the image bundle are generated by using the textures having resolutions higher than the resolutions of the textures used to generate the images disposed in the positions outside the central section or the spread section, whereby the images disposed in the central section or the spread section of the image bundle can be more visible than the images disposed in the positions outside the central section or the spread section and generated by using the textures having low resolutions.

In the display method described above, in the image bundle, any of the images moved in the direction along the second imaginary axis may be generated by using the texture that is selected from a texture memory that stores a plurality of the textures having the resolutions different from one another and has the resolution higher than the resolutions of the textures used to generate the images disposed in the positions outside the central section or the spread section.

According to the display method, any of the images moved in the direction along the second imaginary axis is generated by using the texture having the resolution higher than the resolutions of the textures used to generate the images disposed in the positions outside the central section or the spread section, the image moved upward can be more visible than the images disposed in the positions outside the central section or the spread section.

The display method is a display method including rotating a plurality of images arranged along a first imaginary axis around a second imaginary axis that intersects the first imaginary axis, further rotating the plurality of images around the first imaginary axis, and displaying the plurality of images on a display section. In an image bundle formed of the plurality of images, when any of the images moved in the direction along the first imaginary axis reaches a predetermined position, the image having reached the predetermined position is generated by using the texture selected from a texture memory that stores a plurality of the textures having resolutions different from one another and having the resolution according to the size of the images displayed on the display section.

According to the display method, when any of the images moved in the direction along the first imaginary axis reaches the predetermined position, the image having reached the predetermined position is generated by using the texture having the resolution according to the size of the image displayed on the display section, whereby the moved image can be more visible than the other images.

In the display method described above, any of the images moved in the direction along the first imaginary axis may be generated by using the texture selected from the texture memory and having the resolution lower than the resolution of the texture used to generate the image before being moved.

According to the display method, an image in motion in the direction along the first imaginary axis needs no visibility and is therefore generated by using a texture having a resolution lower than the resolution of the texture used to generate the image before being moved. The free capacity newly provided in the texture memory can therefore be allocated to a higher-resolution texture used to generate the image having reached the predetermined position.

In the display method described above, the image having moved in the direction along the first imaginary axis and approached the predetermined position may be generated by using the texture selected from the texture memory and having the same resolution as the resolution of the texture used to generate the image having reached the predetermined position.

According to the display method, the image having moved in the direction along the first imaginary axis and approached the predetermined position is generated by using the texture having the same resolution as the resolution of the texture used to generate the image having reached the predetermined position, whereby the visibility of the image that approaches the predetermined position can be improved.

A display apparatus includes a display section that displays an image bundle formed of a plurality of images, an image generator that rotates the plurality of images arranged along a first imaginary axis around a second imaginary axis that intersects the first imaginary axis and further rotates the plurality of images around the first imaginary axis to generate the plurality of rotated images, and a controller that generates the images disposed in a central section or a spread section of the image bundle by using the textures selected from a texture memory that stores a plurality of the textures having the resolutions different from one another and having the resolutions higher than the resolutions of the textures used to generate the images disposed in positions outside the central section or the spread section and displays the generated images on the display section.

According to the display apparatus, the images disposed in the central section or the spread section of the image bundle are generated by using the textures having resolutions higher than the resolutions of the textures used to generate the images disposed in the positions outside the central section or the spread section, whereby the images disposed in the central section or the spread section of the image bundle can be more visible than the images disposed in the positions outside the central section or the spread section and generated by using the textures having low resolutions.

What is claimed is:

1. A display method comprising: rotating a plurality of images, that is arranged along a first imaginary axis, around a second imaginary axis that intersects the first imaginary axis; further rotating the plurality of images around the first imaginary axis; and displaying the plurality of images on a display section,
    wherein in an image bundle formed of the plurality of images and including first images disposed in a central section or a spread section of the image bundle and overlapping with each other and second images disposed in positions outside the central section or the spread section and overlapping with each other, each first image being displayed showing first texture included in the first image, each second image being displayed showing second texture included in the second image, an area occupied by each of the first images in the image bundle is greater than an area occupied by each of the second images in the image bundle, and the first images hold and regenerate the first textures having resolutions higher than resolutions of the second textures used to generate the second images, and are generated by using the first textures having the resolutions higher than the resolutions of the second textures used to generate the second images.

2. The display method according to claim 1, wherein in the image bundle, any of the images moved in a direction along the second imaginary axis is generated by using texture that is selected from a plurality of the textures stored in a texture memory and having resolutions different from one another and has a resolution higher than resolutions of textures used to generate the second images.

3. A display method comprising: rotating a plurality of images, that is arranged along a first imaginary axis, around a second imaginary axis that intersects the first imaginary axis; further rotating the plurality of images around the first imaginary axis; and displaying the plurality of images on a display section, the plurality of images including first images disposed in a central section or a spread section of the image plurality of images and overlapping with each other and second images disposed in positions outside the central section or the spread section and overlapping with each other, each first image being displayed showing first texture included in the first image and selected from a plurality of textures stored in a texture memory, each second image being displayed showing second texture included in the second image and selected from the plurality of textures, the first textures having resolutions different from each other, the second textures having resolutions different from each other, the first textures having resolutions higher than resolutions of the second textures, wherein in an image bundle formed of the plurality of images, when any of the images moved in a direction along the first imaginary axis reaches a predetermined position, the image that reached the predetermined position is generated by using texture that is selected from one of the first texture and the second textures having a resolution according to a size of the image displayed on the display section.

4. The display method according to claim 3, wherein any of the images moved in a direction along the first imaginary axis is generated by using texture selected from the texture memory and having a resolution lower than a resolution of texture used to generate the image before being moved.

5. The display method according to claim 3, wherein the image that moved in the direction along the first imaginary axis and approached the predetermined position is generated by using texture selected from the texture memory and having the same resolution as a resolution of texture used to generate the image that reached the predetermined position.

6. A display apparatus comprising:

a display section that displays an image bundle formed of a plurality of images arranged along a first imaginary axis, the image bundle including first images disposed in a central section or a spread section of the image bundle and second images disposed in positions outside the central section or the spread section, each first image being displayed showing first texture included in the first image, each second image being displayed showing second texture included in the second image;

an image generator that rotates the plurality of images around a second imaginary axis that intersects the first imaginary axis and further rotates the plurality of images around the first imaginary axis to generate the plurality of rotated images; and a controller that generates the first images using the first textures that are selected from a plurality of textures stored in a texture memory and having resolutions different from one another and having resolutions higher than resolutions of the second textures selected from the plurality of textures and used to generate the second images, and displays the generated first images on the display section.

* * * * *